Dec. 19, 1967 W. M. BURSTALL 3,358,341
PIPE HOLDING DEVICE AND SLIP SETTING DEVICE THEREFOR
Filed May 23, 1966 3 Sheets-Sheet 2

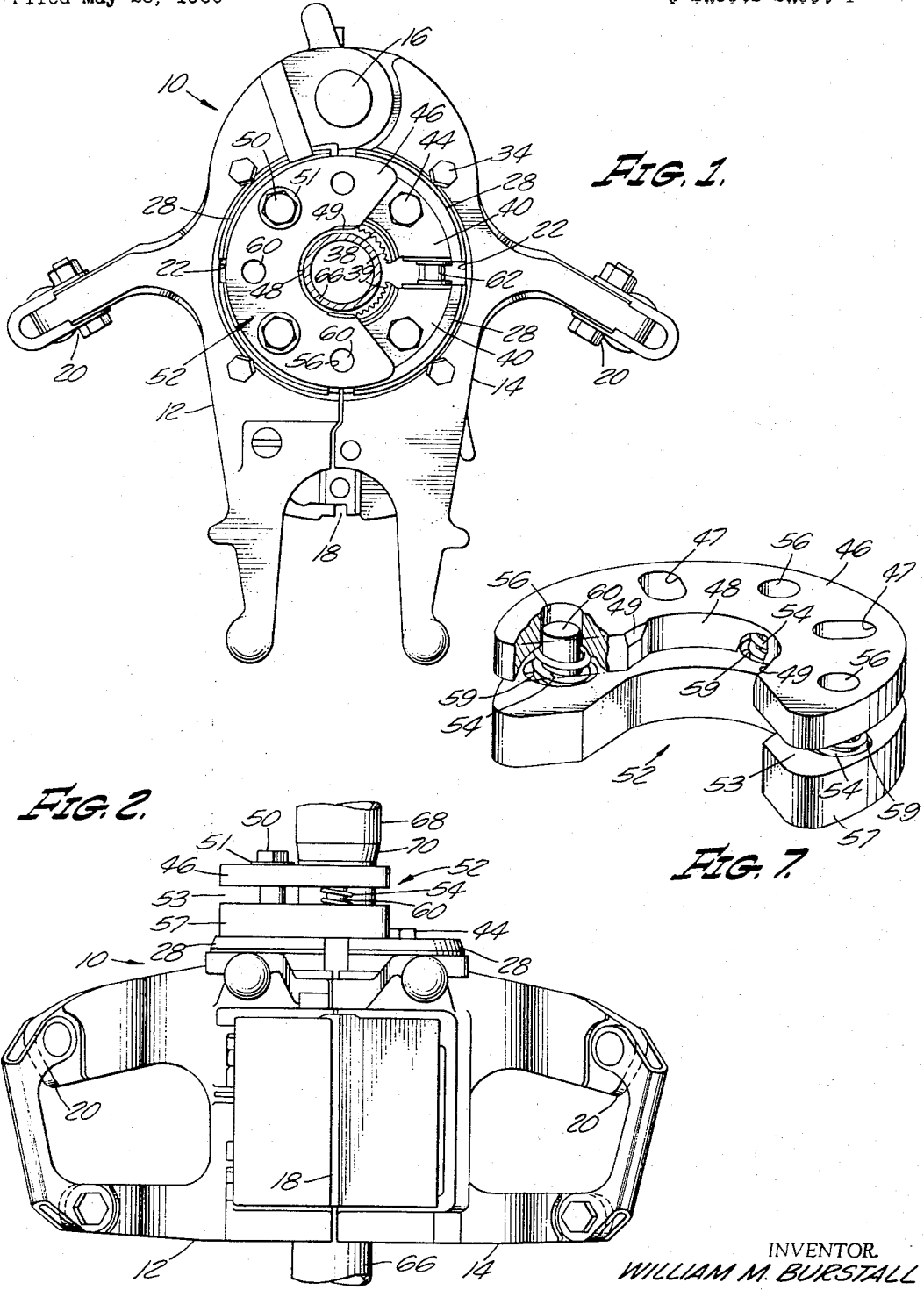

INVENTOR.
WILLIAM M. BURSTALL
BY John O. Evans, Jr.
ATTORNEY

Dec. 19, 1967 W. M. BURSTALL 3,358,341
PIPE HOLDING DEVICE AND SLIP SETTING DEVICE THEREFOR
Filed May 23, 1966 3 Sheets-Sheet 3

INVENTOR.
WILLIAM M. BURSTALL
BY John O. Evans, Jr.
ATTORNEY

United States Patent Office 3,358,341
Patented Dec. 19, 1967

3,358,341
PIPE HOLDING DEVICE AND SLIP SETTING DEVICE THEREFOR
William M. Burstall, Lakewood Heights, Huffman, Tex., assignor to Byron Jackson Inc., Long Beach, Calif., a corporation of Delaware
Filed May 23, 1966, Ser. No. 552,147
10 Claims. (Cl. 24—263)

ABSTRACT OF THE DISCLOSURE

A pipe-supporting apparatus having a tapered bowl with complementary pipe-gripping slips encircling the pipe, and also a slip-setting device with a setting plate spaced by resilient means from a pressure plate above it. On contact of the pipe joint enlargement against the pressure plate, pressure is exerted through the resilient means against the setting plate to the slips, forcing them in unison downwardly and inwardly in the bowl, their gripping surfaces engaging the pipe, preventing further relative movement of pipe through the apparatus. Space between the plates visually indicates proper pipe support by the slips; plate contact shows failure to grip.

---

This invention relates to pipe holding devices such as slip elevators for handling oil well tubing or pipe, particularly of the type provided with integral, externally-upset joints, and to a device for assuring the setting of the gripping dies uniformly against the tubing.

It is common practice in oil well producing operations to use slip-type elevators when lowering or raising tubing into or out of a well. Couplings are used for joining some tubing, thus providing a shoulder when the joint is made up, and against which an elevator may rest for lifting or lowering the pipe. Other tubing, though, has integral joints which may be threaded together, the pipe being a little larger in diameter adjacent the ends to provide thickness and strength for the threads, the two diameters blending on the outside conically to form a taper or shoulder. This invention is particularly useful in handling the latter, integral joint, type of tubing. As the elevator is raised, being encircled about the vertically suspended tubing, the pressure plate of the slip setting device of the elevator contacts the tapered shoulder of the tubing, which forces the slip segments downward and radially inward as they ride against the inner conical surface or seat of the slip bowl, thus effecting a gripping of the insert dies against the outer surface of the tubing. In slip setting ring devices commonly in use, it is often difficult or impossible to know if the gripping dies have actually gripped and taken the load of the string of suspended pipe or if the load has been taken by the pressure plate, in which latter case damaged tubing and equipment may result in costly and time-consuming delays.

It is therefore a primary object of this invention to provide a slip setting device for a slip elevator or the like which indicates, by visual observation, if the gripping dies are supporting the load.

Another object of the invention is to provide a slip setting assembly, the setting plate and pressure plate of which are aligned and resiliently spaced apart to cushion the blows of sudden impacts.

An additional object is to provide a slip setting device which, when overloaded, will allow the pressure plate to contact the setting plate for reinforced support and reduced damage.

Still another object of this invention is to provide a slip setting device easily replaceable if damaged or worn.

Briefly, the invention resides in a slip setting device, including a setting plate and a pressure plate, the two plates having axially aligned, pipe-receiving openings and resilient means spacing the two plates apart, the device adapted to be fastened to the top of a slip-type elevator to effect the gripping of the slips with the tubing on contact of the pressure plate with a tubing upset, proper gripping being indicated by a gap between the two plates and ineffective gripping by contact of the two plates. The invention also resides in a pipe holding device, for example an elevator, which includes such a slip setting arrangement.

Further objects will become evident as the invention is described in the following detailed description taken with the accompanying drawings.

In the drawings:

FIG. 1 is a top view of an exemplary form of slip-type tubing elevator with the slip setting device of this invention, showing the elevator in position around a pipe or tubing;

FIG. 2 is a front elevational view of the elevator of FIG. 1, also with the tubing;

FIG. 7 is a perspective view, on the same scale as FIGS. 3, 4, 5 and 6, of the slip setting ring assembly.

Like reference characters in the various figures of the drawings and in the following detailed description designate corresponding parts.

Figure 4:
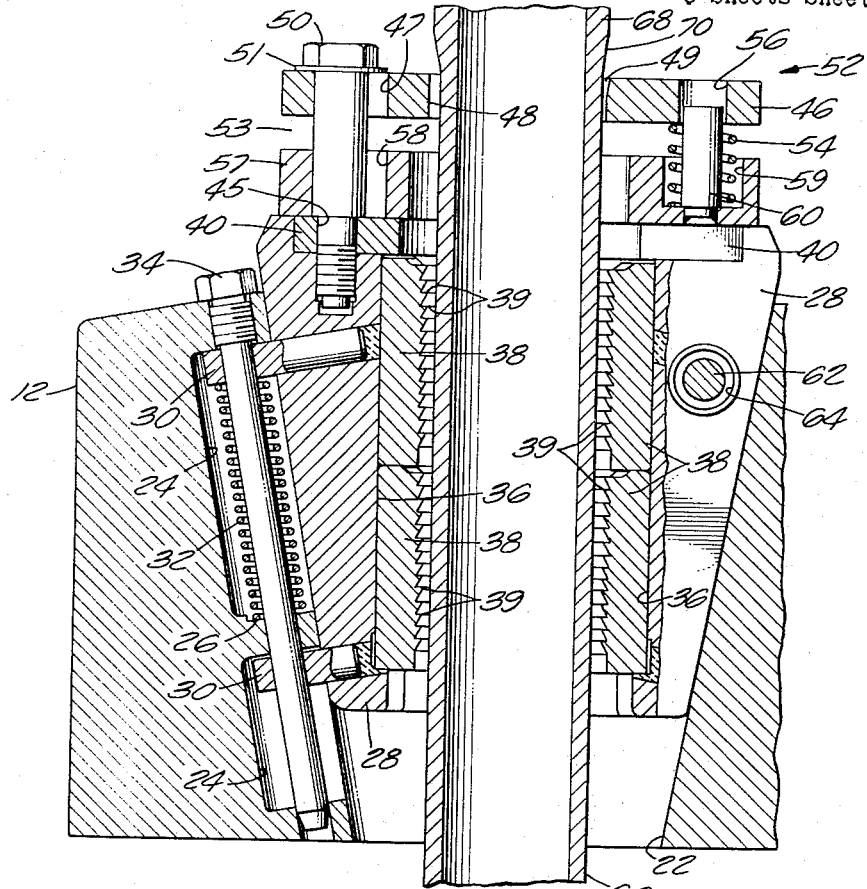
FIG. 4 is a fragmentary sectional view, taken on the line 4—4 of FIG. 3, on the same scale, looking in the direction of the arrows, and showing the slips in the upward or open position.
Figure 3:
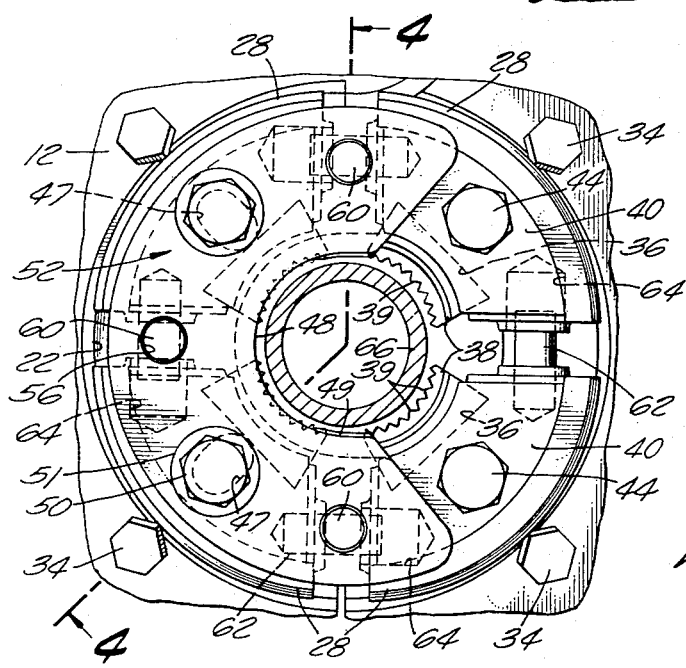
FIG. 3 is a fragmentary top view, on an enlarged scale, of a portion of the elevator of FIG. 1, also with the tubing.

Referring to FIGS. 1 and 2, there is shown an exemplary form of tubing slip elevator 10 with a slip setting ring assembly 52, the elevator 10 including a pair of complementary halves, designated as body half 12 and door half 14, the two halves being hinged together along the rear side by the pivot pin or hinge pin 16, and latched at the front by a latch 18, which prevents inadvertent opening of the elevator. Reference may be made to U.S. Patent No. 2,257,120, issued to C. A. Lundeen on Sept. 30, 1941, for a description of a suitable latch. Each of the body halves has a lifting ear or link support 20, the two ears 20 being spaced on opposite sides in the closed position of the elevator 10 for convenience in hoisting the elevator in the conventional manner by means of a traveling block (not shown) connected to the ears 20 of the elevator 10 by a pair of elevator links (not shown).

As seen also in FIGS. 3, 4, 5 and 6, when the two halves 12 and 14 of the elevator 10 are closed, they have a vertical opening, the inner surfaces of which form a downwardly-tapered conical seat or bowl 22 for the reception of a series of circumferentially spaced slips 28, each of which on its outer surface is conically shaped to fit the bowl or seat 22, so that on longitudinal movement of the slips 28 within the bowl 22, they will be urged radially inwardly on downward movement and radially outwardly on upward movement. The slips 28 are guided in their sliding movement along the seat 22 by the slip lugs 30 extending into body slots 24; and they are urged normally upward and outward by biasing compression springs 32 in the body slots 24 between one of the slip lugs 30 and the spring seat 26. A body bolt 34 passes through the body slot 24, spring 32 and slip lugs 30 to retain the slips 28 in sliding engagement with the bowl 22. The slips 28 are held in vertical alignment by a pin 62 in one side of each, engaging a corresponding hole 64 in the adjacent slip 28.

The slips 28 of the embodiment shown have replaceable gripping dies or inserts 38 which fit into dovetail grooves 36 on the inner face of each slip, so that they may be replaced when their teeth 39 are worn. The dies 38 are retained in their respective grooves 36 by die retainers 40, the inner portions of which extend over the open ends of the grooves 36. The insert retainers 40 are secured to the tops of their respective slips 28 through their bolt holes 45 by bolts 44 in the slips in the door half 14 and by the shoulder of shoulder bolts 50 in the body half 12 of the elevator 10. The upper portions of the shoulder bolts 50, with washers 51 under their heads, pass through radially extending slots 47 and 58 of the slip setting ring assembly 52, with sufficient clearance so that the upper bolt portions may move radially as the dies 38, to the top of which they are attached, move radially toward and away from the gripped tubing 66. The setting plate 57 of the slip ring assembly 52, when attached to the slips 28 on the body half 12 of the elevator 10, has its ends extending over the top of the slips 28 in the door half 14 of the elevator when closed.

Referring also to FIG. 7, the setting plate 57 of the slip setting ring assembly 52 is shown as it is aligned vertically with the pressure plate 46, its guide pins 60 mating with corresponding holes 56 in the plate 46, the two plates being parallel and spaced apart, leaving a gap 53, by resilient compression springs 54 around each pin 60 and seated in recesses 59 of the setting plate 57. The axial side opening 48 of the pressure plate 46 has diametrically opposed hardened contact surfaces 49 to engage the upset shoulder 70 adjacent the enlarged joint diameter 68 of the tubing 66.

In operation of the invention, the slip setting ring assembly 52 is attached by means of shoulder bolts 50 to the top of the slips 28 and insert retainers 40 on the body half 12 of the elevator 10, the shoulder of the bolt 50 clamping the insert retainers 40 to the top of the slips 28. The slip-type elevator assembly 10, supported at its ears 20 by a pair of traveling block links (not shown), is encircled around a length of vertically supported tubing 66 by opening the latch 18, spreading apart about the hinge 16 of the body half 12 and door half 14 of the elevator 10, then closing the latch 18 with the elevator 10 and slip setting ring assembly 52 aligned axially with a length of tubing 66, the open ends of the setting plate 57 extending over the slips 28 in the door half 14, thus aligning all slip segments 28. As the elevator 10 is elevated around the tubing 66, the contact points 49 in the opening 48 of the pressure plate 46 engage the tubing shoulder or bevel 70, further hoisting of the elevator 10 lifting the pipe 66, its weight acting against the contact points 49 and through the resilient compression springs 54 to force the pressure plate 57 downward against the slips 28, normally held upward and outward in their open positions by the slip springs 32 as in FIG. 4. The springs 32 being more easily compressible than the pressure plate springs 54, the slips 28 are forced downward and radially inward along the conical bowl or seat 22, the dies 38 being thus forced radially inward to their closed positions, their teeth 39 gripping into the pipe as in FIG. 5, to support the load of the pipe 66, the downward movement of the pressure plate 46 thereby being halted, leaving a gap 53 between the plates 46 and 57, the gap 53 providing a visual signal that the pipe 66 is being gripped by the dies 38 of the slips 28. The slots 47 and 58 provide clearance for radial movement of the slips 28 and their shoulder bolts 50.

Figures 5, 6:
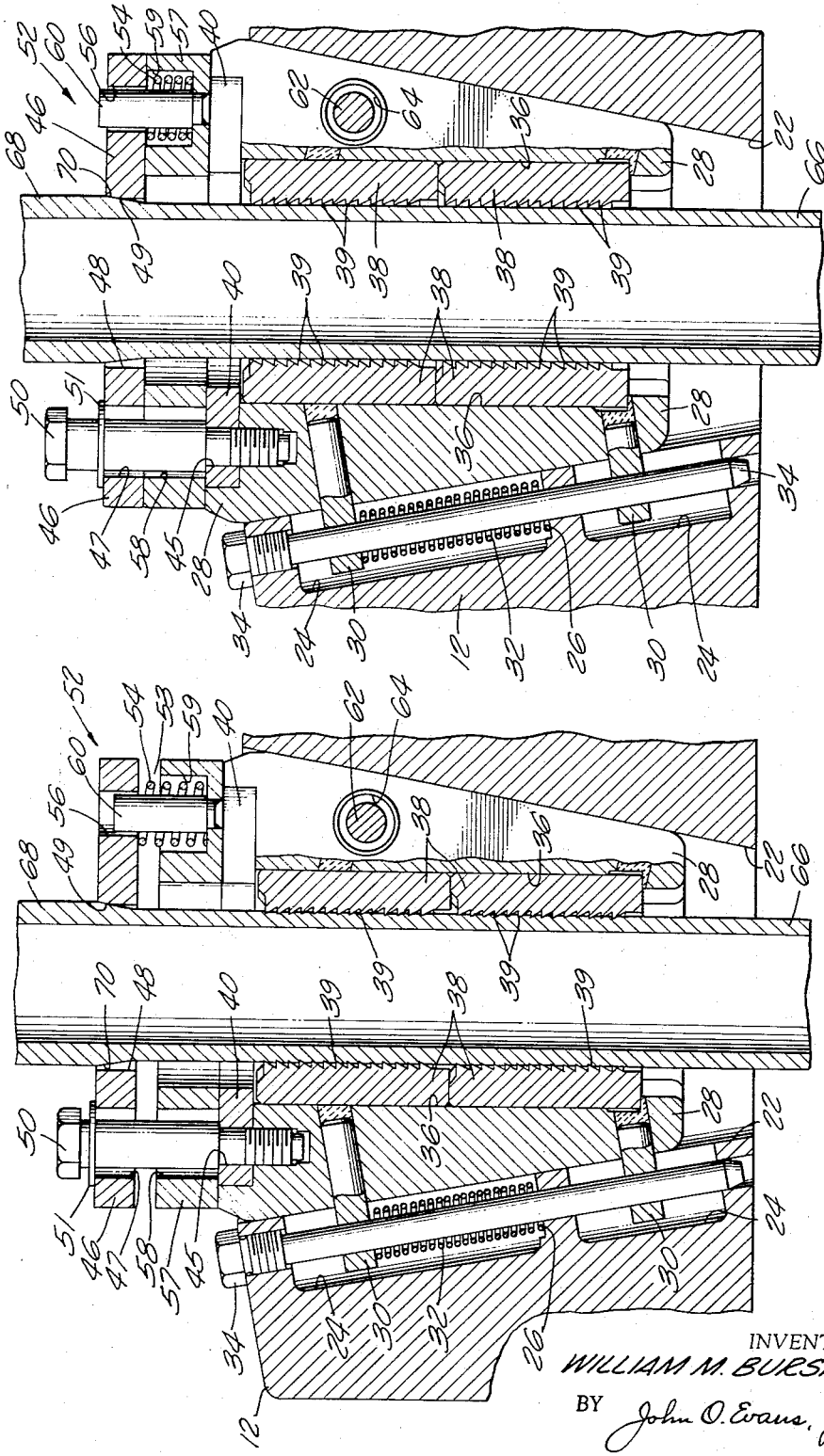
FIG. 5 is a fragmentary sectional view, similar to FIG. 4, but showing the slips in their lower or closed position, the dies gripping the tubing.
FIG. 6 is a fragmentary sectional view, similar to FIG. 4, but showing the slips in a non-gripping position, the tubing being supported at the tubing shoulder.

In the event that the pipe 66 is defective or the die teeth 39 are worn so that they do not grip into the tubing 66 for any reason, as in FIG. 6, the load of the tubing 66 will continue to be taken at the contact area 49 with the tubing bevel 70, forcing the pressure plate 46 down against the setting plate 57 so that there is no gap between the two plates 46 and 57. This contact or lack of gap is a visual signal that the insert die teeth 39 are not gripping the pipe or tubing 66. Then the elevator 10 is lowered and raised again for a better grip or new dies installed; otherwise the concentrated load on the tubing shoulder 70 and contact points 49 may damage the pipe 66 or the pressure plate 46, or cause the two to get bound or stuck together.

The device is constructed in such a way that the resilient pressure plate springs 54 are stronger than the biasing slip springs 32; that is, the deflection/force ratio or characteristic of the former is greater than the deflection/force characteristic of the latter, so that for any given force or load, the springs 32 will deflect and compress ahead of the springs 54. Under normal operation, while the springs 32 are being deflected, the slips 28 traveling downward and inward toward pipe-gripping positions, the same load or force being transmitted through the springs 54 and 32, the springs 32 will thereby be deflected ahead of the springs 54, thus maintaining a gap 53 between the plates 46 and 57 when the slips 28 grip the pipe 66 and there is no longer any relative vertical movement between them, as in FIG. 5. If, however, the slips 28 are stopped in their downward travel and the dies 38 fail to grip the pipe 66, as in FIG. 6, the pipe may still continue its downward movement, its shoulder 70 in contact with the surfaces 49 of the pressure plate 46, resulting in further deflection and compression of the resilient springs 54 into their recesses 59, until the plate 46 contacts the plate 57, this contact or lack of gap indicating abnormal performance, resulting from failure of the dies 38 to grip the tubing 66.

While one form of the device has been shown by way of illustration, it should be understood that various modifications will occur to one skilled in the art. For example, the pressure plate springs 54 might be hydraulic or pneumatic springs, or of rubber; and it should be understood also that the invention is applicable to spiders for supporting pipe and other similar applications as well as to elevators for hoisting pipe. Moreover, while the specific embodiment of the invention shown herein by way of illustration is adapted for handling oil well tubing having integral, externally-upset joints, it will be understood that it is also capable of handling oil well tubing or pipe joined together with couplings; the shoulder provided by the coupling will actuate the slip setting device by contacting the pressure plate 46 similarly to the way in which the tubing bevel 70 of the pipe 66 actuates the slip setting device.

I claim:

1. A pipe holding device comprising:
   (a) a body having a vertical opening, the walls of which are downwardly tapered to provide a seat;
   (b) slips circumferentially arranged on said seat to surround a pipe extending through said opening, said slips being slidable on said seat from upper, outer positions in which said slips release said pipe to lower, inner positions in which said slips grip said pipe;
   (c) biasing means urging said slips toward said outer positions; and
   (d) a slip-setting device for moving said slips from said outer positions to said inner positions against the urgence of said biasing means, said slip-setting device including
   (e) a setting plate overlying said slips and adapted, upon downward movement, to move said slips in unison from said outer positions to said inner positions;
   (f) a pressure plate above said setting plate and spaced therefrom, said pressure plate having means for engagement with a portion of said pipe for moving said pressure plate downward upon relative upward movement of said body with respect to said pipe;
   (g) resilient means for moving said setting plate downward in response to downward movement of said pressure plate, said resilient means allowing relative vertical movement between said plates, said relative vertical movement between said plates being limited by contact of said pressure plate with said setting plate; and (h) guide means for maintaining vertical alignment between said plates during said relative vertical movement.

2. A pipe holding device as defined in claim 1 wherein said guide means includes a vertical pin on one of said plates, and the other of said plates providing a vertical hole slidingly receiving said pin.

3. A pipe holding device as defined in claim 1 wherein said plates are parallel to each other and said resilient means is arranged to permit said pressure plate to be moved downward into said contact with said setting plate when said slips are stopped in their downward movement short of said inner positions, whereby said contact indicates that said slips have failed to grip said pipe.

4. A pipe holding device as defined in claim 3 wherein said resilient means comprises a spring compressible between said plates, and means providing a recess in one of said plates for reception of said spring when said plates have moved into said contact with each other.

5. A pipe holding device as defined in claim 3 wherein said resilient means has a deflection/force characteristic so related to the deflection/force characteristic of said biasing means that, in normal operation, said resilient means is deflected insufficiently to permit said plates to make said contact with one another while said biasing means is being deflected as said slips are being moved from their upper positions to their lower positions in response to downward movement of said pressure plate.

6. A pipe holding device as defined in claim 1 wherein said plates are parallel to each other; wherein said resilient means comprises a vertically disposed helical spring compressible between said plates, and one of said plates provides a recess for reception of said spring to permit said pressure plate to be moved downward into said contact with said setting plate when said slips are stopped in their downward movement short of said inner positions in which said slips grip said pipe, whereby said contact indicates that said slips have failed to move into said inner positions; and wherein said guide means includes a vertical pin on said one plate, said pin being surrounded by the coils of said spring, and the other of said plates providing a vertical hole slidingly receiving said pin.

7. A pipe holding device as defined in claim 1 wherein the means for engagement of said pressure plate of said setting device with a portion of said pipe prevents lateral movement of said setting device with respect to said pipe, and said slip-setting device comprising means for fastening it to one of said slips, said fastening means allowing said slip to move laterally with respect to said slip-setting device from the outer position of said slips to the inner position thereof.

8. A slip-setting device comprising:
    (a) a setting plate;
    (b) a pressure plate above said setting plate and spaced therefrom;
    (c) resilient means for moving said setting plate downward in response to downward movement of said pressure plate, said resilient means allowing relative vertical movement between said plates, said relative vertical movement between said plates being limited by contact of said pressure plate with said setting plate; and
    (d) guide means for maintaining vertical alignment between said plates during said relative vertical movement.

9. A slip-setting device as defined in claim 8 wherein said plates are parallel to each other; wherein said resilient means comprises a vertically disposed helical spring compressible between said plates, and one of said plates provides a recess for reception of said spring to permit said pressure plate to be moved downward into said contact with said setting plate; and wherein said guide means includes a vertical pin on said one plate, said pin being surrounded by the coils of said spring, and the other of said plates providing a vertical hole slidingly receiving said pin.

10. A slip-setting device as defined in claim 8 wherein said resilient means is compressible on overloading of said slip-setting device, whereby to provide said contact of said pressure plate with said setting plate to reinforce said pressure plate, so as to avoid damage to said device resulting from the overloading.

References Cited

UNITED STATES PATENTS

| 1,079,690 | 11/1913 | Bowler et al. | |
| 2,874,436 | 2/1959 | Allen | 24—263.5 |
| 3,140,523 | 7/1964 | Taylor | 24—263.5 |
| 3,287,776 | 11/1966 | Brown | 24—263.5 XR |

FOREIGN PATENTS 862,411  3/1961  Great Britain.

DONALD A. GRIFFIN, *Primary Examiner.*